United States Patent Office 2,794,783
Patented June 4, 1957

2,794,783

COLLOIDAL SILICA PRODUCTS

Ernst Podschus, Leverkusen-Bayerwerk, Germany, assignor to Farbenfabriken Bayer Aktiengesellschaft, Leverkusen, Germany, a corporation of Germany No Drawing. Application July 15, 1953,
Serial No. 368,234

Claims priority, application Germany July 17, 1952

5 Claims. (Cl. 252—313)

The present invention relates to a process of producing colloidal silica products.

Finely divided solid substances with primary particles of below about $0.05\mu$ in diameter have gained a considerable technical importance. They are employed to a large extent, for instance, in the rubber industry to improve the mechanical properties of vulcanization products. Besides carbon black and zinc oxide, also alumina and silica have found increasing application during the recent years. Active, very finely divided silica was originally obtained, similarly to carbon black, from silicon tetrachloride in the gaseous phase. Later on, a method was devised to produce highly dispersed silica from alkali metal silicate solutions by precipitation in the aqueous phase. This involves the difficulty of conducting the precipitation so that silica is obtained colloidally fine but nevertheless well friable after drying without caking together to form a hard, gel-like mass. Such hard gels are formed in the direct decomposition of water glass solutions by means of an acid and in the precipitation with numerous salt solutions for instance with zinc, magnesium and mostly with aluminum salts.

In accordance with the invention I have found that very finely divided, colloidal, well dispersible substances containing silica, the particle size of which is at the lower limit of the previously known precipitated silica products, are obtained by reacting an alkali metal silicate solution, preferably a commercial sodium water glass solution ($Na_2O:SiO_2=$ about 1:3.5) with a solution of a salt of a metal, which forms precipitates with alkali metal silicate, in the presence of an alkaline reacting salt, such as a carbonate, which is miscible with alkali metal silicate solutions without forming precipitates. A preferred embodiment comprises the reaction of zinc sulfate solution or zinc chloride solution with a mixture of water glass solution and sodium carbonate solution. Instead of an alkali metal carbonate, an alkali metal sulfide, for example, may be employed.

The precipitation of a zinc salt solution with water glass gives rise to a precipitate consisting substantially of silica and zinc hydroxide, which yields hard non-dispersible gel-like lumps after drying. If into a water glass solution, for instance of a concentration of about 0.2–0.5 mol of $Na_2O$ per liter, is introduced an approximately equal quantity referred to $Na_2O$ of sodium carbonate solution and precipitation is effected with the equivalent quantity of a zinc salt solution, very finely divided colloidal and well friable products are obtained after filtering, washing and drying. Water-glass is miscible with sodium carbonate solution of the said concentration at ordinary temperatures; a precipitate containing silica forms only by heating the mixture to temperatures above about 70° C. The precipitate consisting of silica, zinc hydroxide and basic zinc carbonate can be employed as such, for instance as rubber filler, preferably as an activator instead of zinc oxide, after drying and grinding. A photograph taken by an electronic microscope shows that the primary particles have a diameter below about $0.02\mu$. A difference between silica and zinc hydroxide or basic carbonate particles cannot be observed. Both particles are of about equal fineness. It is likewise possible to heat the precipitate to high temperatures, for instance about 300–700° C., in order to convert the basic zinc carbonate to zinc oxide. Within this temperature range the particles of zinc oxide and silica do not grow perceptibly. Both components retain their extraordinary fineness.

The process of the invention may further be exemplified by way of the precipitation of magnesium salts with a mixture of water glass and sodium carbonate solution. This reaction, however, requires an increase of the carbonate content in proportion to water glass as compared with the zinc precipitation; furthermore, water glass and sodium carbonate must be applied at least in the molecular proportion 1:2 if dispersible, soft products are to be produced. Moreover, the precipitate obtained with magnesium salts differs from the zinc precipitate in that the basic magnesium carbonate is essentially coarser and forms characteristic thin leaflets which are visible in the photograph taken with the electron microscope. Products containing aluminum are prepared in analogous manner. As a matter of fact, it is also possible to produce mixed products containing for instance zinc, magnesium and aluminum compounds.

By decomposing the precipitate containing zinc with acid, for instance excess hydrochloric acid, a very finely divided silica is obtained, which can be ground after drying in the same manner as the original precipitate containing zinc, and is likewise suitable as a filler for rubber.

*Example 1*

640 cc. of a $ZnCl_2$ solution of a concentration of 1.88 gram mols per liter are diluted to 2 liters (0.6 gram mol/liter). 346 cc. of sodium water glass solution ($Na_2O:SiO_2=1:3.35$) with 1.73 gram mols of $Na_2O$ per liter are mixed with 357 cc. of $Na_2CO_3$ solution (1.68 molar) and made up to 2 liters. The two solutions are heated to 65° C. and the solution 2 is introduced into the solution 1 with stirring. The resultant precipitate is filtered off, washed, dried at 110° C. and ground. The product contains about 55% of $SiO_2$ and is obtained in a very finely divided and easily dispersible condition.

*Example 2*

640 cc. of a $ZnCl_2$ solution of 1.88 gram mol/liter are diluted to 1 liter and heated to 60° C. Into this solution is added with stirring a mixture of 230 cc. of water glass solution (1.73 molar) and 476 cc. of $Na_2CO_3$ solution (1.68 molar) which was filled up to 1 liter and heated to 60° C. The precipitate is filtered, washed, heated to 300° C. for about two hours and ground after cooling. The product contains about 45% of $SiO_2$ and is particularly useful for use as activator in vulcanized rubber.

I claim:

1. In the process for the production of dispersible, colloidal silica-containing products by reacting an aqueous alkali metal silicate solution with an aqueous solution of a metal salt forming precipitates with alkali metal silicate, the steps which comprise mixing an alkali metal silicate solution of a concentration of about 0.2–0.5 mol of alkali metal oxide per liter with a quantity of an alkaline reacting salt solution in the proportion of 1:1–1:2 referred to alkali metal oxide, said alkaline reacting salt solution being miscible at normal temperature with an alkali metal silicate solution without forming precipitates and consisting of alkali metal carbonate, thereafter reacting the mixture thus obtained with a solution of a metal salt selected from the group consisting of zinc, magnesium and aluminum forming precipitates with an alkali metal silicate solution, and recovering from the reaction mixture a finely divided precipitate of silica, metal hydroxide and basic metal carbonate, the single particles having a diameter below about $0.02\mu$.

2. Process as claimed in claim 1, in which the reaction is performed at temperatures between 60 and 65° C.

3. Process as claimed in claim 1, in which the precipitate formed is calcined at 300–700° C. and a product is recovered consisting essentially of silica and metal oxide, the single particles having a diameter below about $0.02\mu$.

4. Process as claimed in claim 1 in which the recovered precipitate is treated with an acid, separated, washed and dried.

5. Process as claimed in claim 1 in which the metal salt is a member of the group consisting of zinc, magnesium and aluminum salts.

References Cited in the file of this patent

UNITED STATES PATENTS

| | | |
|---|---|---|
| 2,428,895 | Shoeld | Oct. 14, 1947 |
| 2,645,620 | Paterson | July 14, 1953 |